Oct. 23, 1934.  W. A. GIGER  1,978,080
ARTICULATED LOCOMOTIVE
Filed Feb. 20, 1933  2 Sheets-Sheet 1
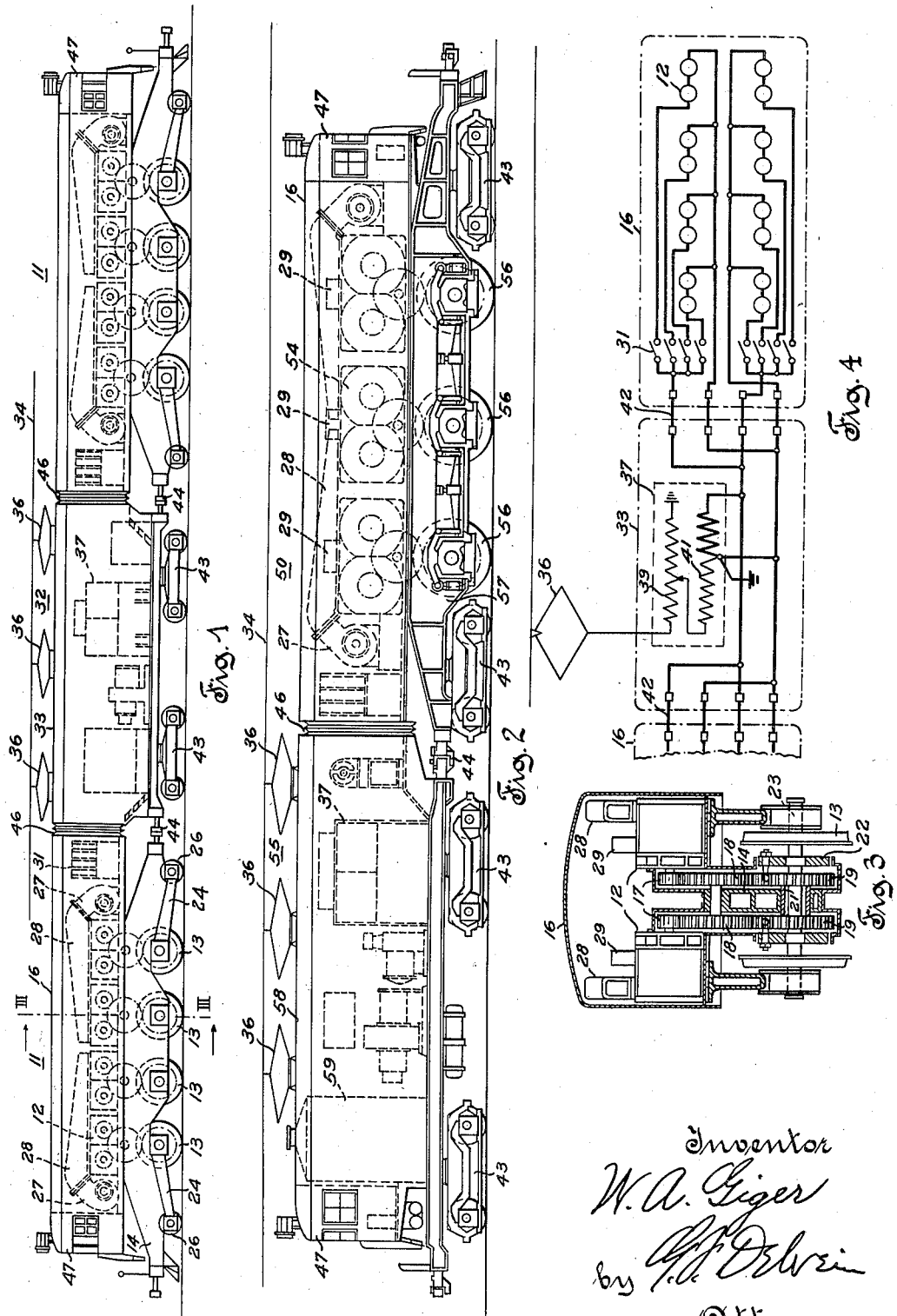

Oct. 23, 1934.　　　　W. A. GIGER　　　　1,978,080
ARTICULATED LOCOMOTIVE
Filed Feb. 20, 1933　　　2 Sheets-Sheet 2
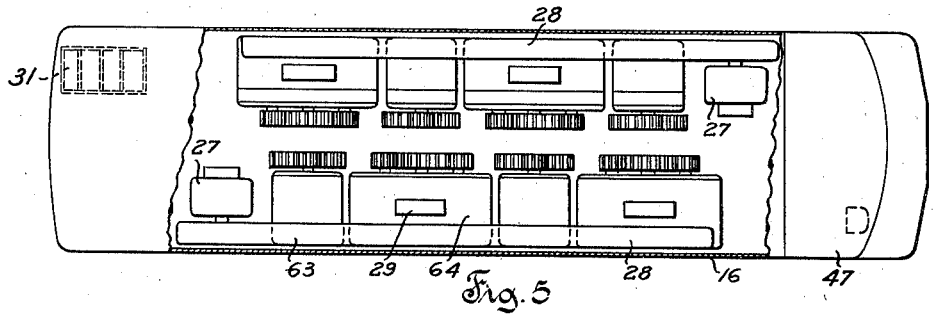
Fig. 5
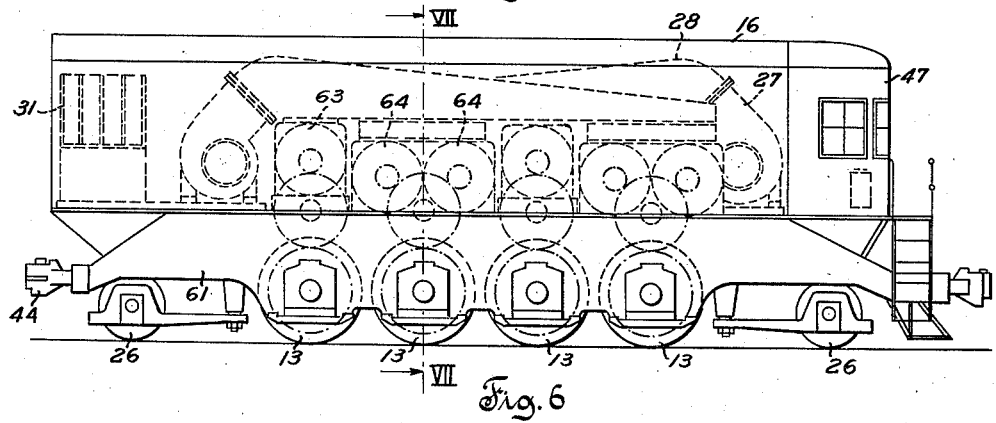
Fig. 6
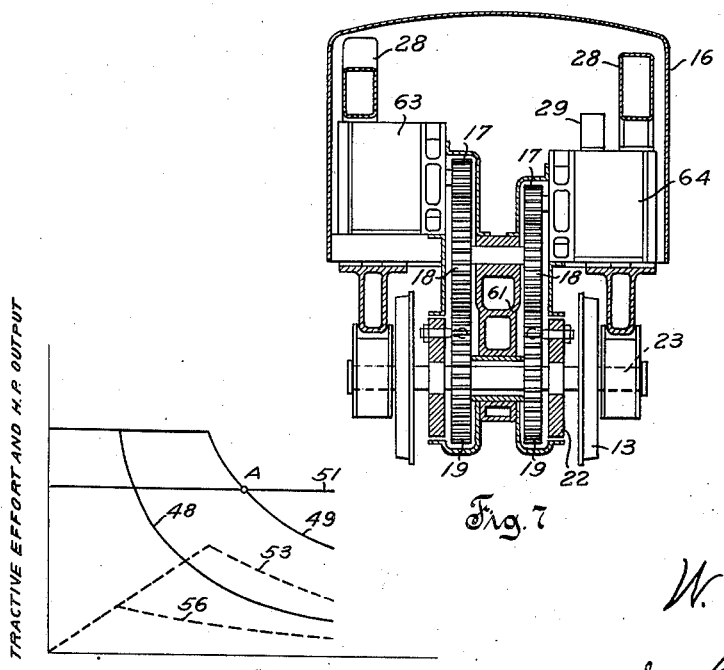
Fig. 7
Fig. 8
Inventor
W. A. Giger
by G. J. Erlwein
Attorney Patented Oct. 23, 1934

1,978,080

UNITED STATES PATENT OFFICE 1,978,080

ARTICULATED LOCOMOTIVE

Walter A. Giger, Milwaukee, Wis., assignor to Allis-Chalmers Manufacturing Company, Milwaukee, Wis., a corporation of Delaware Application February 20, 1933, Serial No. 657,489

4 Claims. (Cl. 105—49)

This invention relates to improvements in electric locomotives and more particularly in locomotives in which the tractive effort must be maintained near the maximum value thereof permitted by the adhesion of the driving wheels over a considerable range of speeds.

It is well known that, in the face of a continuous increase of the weight and of the speed of electrically propelled trains, it has not been found possible to increase the power of electric locomotives to a corresponding extent because of numerous limitations of the different factors governing the construction of locomotives. Such limitations are present in locomotives receiving electric current from a trolley wire or a third rail as well as in locomotives generating their own current in a power plant located in the locomotive cab.

The tractive effort which motors of the usual series type are capable of giving to a locomotive at standstill is usually so large as to exceed the adhesion of the driving wheels and must therefore be reduced by limiting the flow of current through the motors so as to prevent the driving wheels from slipping. The value of the adhesion of the driving wheels is determined by the loading of the wheels which is at present at the limit permitted by the construction of the track, of the roadbed, and of bridges over which the locomotive must pass. Within the range of the normal running speeds, however, the tractive effort decreases rapidly as the speed increases due to the well known characteristics of the series motors. At the maximum running speed of the locomotive the tractive effort is only a small fraction of the value thereof at standstill or at low speeds and the adhesion of the wheels is therefore then utilized only to a very small extent. The locomotive is thus capable of starting a train of a certain maximum weight but will be unable to accelerate such train above the speed at which the tractive effort decreases materially below the adhesion of the driving wheels. Conversely the same locomotive is only capable of pulling, at normal running speed, a much lighter train for which, however, the starting tractive effort of the locomotive is not fully utilized.

The above disadvantages are inherent in the present type of electric locomotives and cannot apparently be entirely removed, but considerable advantage may be derived from diminution of such disadvantages by a considerable extent. An increase of the tractive effort at all speeds could be obtained by increasing the number of driving wheels of the locomotive and thus increasing the amount of track adhesion available. On high speed locomotives, however, the limit of the number of driving wheels has already been reached as the driving axles constitute a rigid wheel base which must not exceed a certain length to permit the locomotive to operate on tracks with curves of the usual small radii. The tractive effort could be increased at high running speeds only by providing each driving axle with larger motors. In the usual type of locomotive this is, however, not feasible unless the motors are placed in the locomotive cab instead of being mounted in the frame. The diameter of the traction motors, of which there are usually one or two for each driving axle, then becomes very large so that it becomes necessary to increase the spacing between adjacent driving axles, thereby reducing the number of axles which may be assembled in a single frame. The space in the cab above the driving axles being utilized for the motors, the control equipment and the auxiliary equipment of the locomotive, which also requires considerable space, must then be removed to the front and to the rear of the motors, and the cab becomes of such length as would exceed the limits of loading gauge or the loading limits when the locomotive is passing on curves of small radius, and would be of impracticable construction.

To obtain the desired tractive effort at high running speeds, the most common expedient has been to use two or more identical locomotive units which are coupled either temporarily, semi-permanently or permanently and are jointly controlled from a single control compartment. Such group of locomotives is considerably heavier and more expensive than a single locomotive having the same aggregate capacity as several frames; motor groups, transformers, switching equipment, etc. are considerably larger and heavier than a single frame, motor group, transformer, switching equipment, etc. of the same total rating. It is true that the use of several locomotive units also gives an increase of the tractive effort at starting but such tractive effort is not utilized to any greater extent than it is when a single unit is used to pull a lighter train at the same running speed. In addition the multiplication of the pieces of equipment increases the number of parts which may become defective and cause the entire group to become inoperative.

A greater tractive effort at running speeds may be obtained without increasing the number of driving axles by increasing the output of the traction motors of each driving axle and by removing some of the control and the auxiliary equipment of the locomotive into a separate auxiliary car or unit, thereby providing the necessary amount of space for the motors in the cab of the driving unit and also providing sufficient space for the auxiliary equipment while maintaining the dimensions of the locomotive within the limits of the loading gauge. If the number of driving axles required cannot be assembled in a single frame, such axles may conveniently be mounted into two or more driving units associated with a single auxiliary unit carrying the auxiliary equipment required for all driving units. By providing each driving axle with more than two traction motors the diameter of the motors may be reduced to such extent that adjacent driving axles may be brought into closer proximity which is limited only by the proximity of the flanges of adjacent wheels. The rigid wheel base of the locomotive may thereby be reduced or a larger number of driving axles may be provided to form a wheel base of predetermined length.

It is, therefore, among the objects of the present invention to provide an electric locomotive having a larger output than could be obtained heretofore in a locomotive of the same rigid wheel base.

Another object of the present invention is to provide an electric locomotive having a larger output than could be obtained heretofore in a locomotive having the same number of driving axles.

Another object of the present invention is to provide an electric locomotive having a larger output than could be obtained heretofore in a locomotive having the same total weight.

Another object of the present invention is to provide an electric locomotive having traction motors mounted in a single frame aggregating a larger output than could be obtained heretofore.

Another object of the present invention is to provide an electric locomotive having a tractive effort closer to the adhesion limit of the driving wheels at higher running speeds than was possible heretofore.

Another object of the present invention is to provide an electric locomotive having a higher tractive effort at the maximum running speed of the locomotive than was obtainable heretofore.

Another object of the present invention is to provide an electric locomotive comprising one or more driving units and a separate auxiliary unit carrying control and auxiliary equipment for all driving units.

Another object of the present invention is to provide an electric locomotive having driving axles each equipped with more than two motors.

Another object of the present invention is to provide an electric locomotive in which the driving axles are provided with traction motors mounted above the frame in the locomotive cab.

Another object of the present invention is to provide an electric locomotive in which the traction motors and the control and auxiliary equipment are easily accessible for inspection and repairs.

Another object of the present invention is to provide an electric locomotive in which the distance between adjacent driving axles is limited only by the proximity of the flanges of adjacent wheels.

Objects and advantages other than those above set forth will be apparent to those skilled in the art from the following description when read in connection with the accompanying drawings, in which:

Fig. 1 illustrates, in side elevation, one embodiment of the present invention consisting of a freight locomotive having two driving units associated with a common auxiliary and control unit receiving current from a trolley line;

Fig. 2 illustrates, in side elevation, another embodiment of the present invention consisting of a passenger locomotive having one driving unit associated with one auxiliary and control unit;

Fig. 3 is a section along line III—III in Fig. 1;

Fig. 4 is a partial simplified diagram of the power circuits of the embodiment illustrated in Fig. 1;

Fig. 5 illustrates, in plan view and partially in section, a modified construction of one of the driving units illustrated in Fig. 1;

Fig. 6 is a side elevation of the modified embodiment illustrated in Fig. 5;

Fig. 7 is a section along line VII—VII in Fig. 6; and

Fig. 8 is a diagram of the tractive efforts and motor outputs of a locomotive constructed in accordance with the present invention and of a locomotive having the same number of driving axles but of the type known heretofore.

Referring more particularly to the drawings by characters of reference, reference numeral 11 designates either of the driving units utilized in the embodiment illustrated in Fig. 1. Each driving unit is provided with a plurality of traction motors 12 of which four are provided for driving each pair of driving wheels 13. The motors of each unit are mounted above the frame 14 of the unit in a common cab 16. As shown in Fig. 3, each motor is provided with a pinion 17 meshing with an intermediate gear 18 which drives a second gear 19 mounted on a hollow shaft or quill 21. Each gear 19 is flexibly connected by any suitable means known in the art with a crank 22 mounted on the axle 23 of driving wheels 13. Axle 23 passes through the hollow shaft 21 without being in contact therewith; such relation of the shaft with the axle and the flexible connection between the gear and the crank permitting displacement of axle 23 with respect to frame 14 in all directions within predetermined limits. In the present embodiment, the median driving axles of each unit are permitted to take a limited sidewards motion, while the extreme driving axles are each mounted in a truck 24 also carrying the axle of a pair of idling wheels 26. The extreme driving axles are thus permitted to move angularly around the pins of trucks 24, the movements of the several driving axles facilitating and guiding the passage of the unit over curves of small radius. The space within cab 16 which is not utilized for the traction motors may receive a portion of the locomotive auxiliary equipment and preferably that portion of such equipment which should be located in close proximity to the traction motors.

In the present embodiment, such auxiliary equipment is shown as comprising a plurality of blowers 27 providing the cooling air for the traction motors to which such air is conducted through a plurality of ducts 28. Each motor also preferably carries its individual reverser 29 (not shown in Fig. 1) so as to reduce the length of the several connections between each reverser and the associated motor. Cab 16 may also carry a plurality of circuit breakers 31 provided with overload relays of the usual type and providing protection for the traction motors against overloads and short circuits. The greater part of the auxiliary equipment associated with the two driving units is located in an auxiliary and control unit 32 having a cab 33 carried by trucks 43 of any well known type; such trucks, being provided with wheels of small diameter, permit placing the floor of cab 33 close to the track so that a large amount of space is available in the cab. Cab 33 may be provided with a plurality of pantographs 36 for collecting current from a trolley wire 34. Assuming that the source of supply for the present embodiment is single phase alternating current at suitable frequency the most important piece of equipment carried by unit 32 is then a transformer 37 supplying current to the motors of both units 11.

The control of the current flow through the several motors for starting and for speed regulation may be effected in any well known manner. As shown in Fig. 4, in the present embodiment it is assumed that transformer 37 comprises an auto transformer winding 39 provided with a plurality of taps and a second auto transformer winding 41, the two windings being wound on separate legs of a core structure preferably provided with an unwound leg forming a return circuit for the fluxes in the two auto transformers. Regulation of the current in the motors is effected by variably connecting the second auto transformer winding with the taps of the first auto transformer winding as is well known in the art. The motor current is conducted between the auxiliary unit and the driving units over flexible connections as at 42 which can be established without difficulty. The auxiliary and control unit and the driving units are preferably connected by the usual type of draw bar coupling 44 and the cabs may be interconnected by the usual type of flexible vestibule diaphragms 46. In the present embodiment, each driving unit is provided with a control compartment equipped with a master controller (not shown) controlling the operation of the motors of both units and provided with the usual instruments, brake valves, etc., necessary for operation of the locomotive by the motorman.

In the embodiment illustrated in Fig. 2, the locomotive is provided with a single driving unit 50 having three pairs of driving wheels 56 mounted in a common frame 57 to form a rigid wheel base. Each driving axle is driven by four motors 54 in a manner similar to that described for the embodiment illustrated in Fig. 1. In the present embodiment, the weight of the driving unit, in excess of that which may be carried by the driving axles, is carried by trucks 43 pivotally connected with frame 57. The auxiliary and control unit 55 associated with driving unit 50 is preferably provided with a cab 58 having a control compartment 47 similar to that of cab 16. If the locomotive is designed for passenger service as is assumed in the present embodiment, the auxiliary unit will preferably be provided with a steam boiler 59 for supplying steam to the heaters located in the coaches.

In the modified driving unit illustrated in Fig. 5, the driving motors are shown in a novel arrangement comprising single motors 63 and twin motors 64. Each driving axle is then driven by a single motor 63 acting on one of the gears 19 and by a pair of twin motors 64 acting on the axle through the other gear 19. The arrangement of the motors of adjacent axles is reversed so as to provide the same alternation of single and of twin motors on each side of the cab and also to permit the axles to be arranged in a common frame 61 in the closest possible proximity. In the present embodiment the distance between axles is limited only by the proximity of the flanges of adjacent wheels due to the particular arrangement of the motors in the cab. All driving axles are shown as constituting a rigid wheel base, the movement of the unit over the track being guided by idling axles 26 mounted in pony trucks.

In the above described embodiments, it was assumed that the locomotive was supplied with single phase alternating current from a trolley line. If the source of supply for the locomotive is a direct current source, the traction motors will be direct current motors and transformer 37 will be replaced by starting resistances provided with suitable switching equipment to permit a gradual regulation of the starting current of the motors. Suitable switching means will also be provided for regulating the speed of the locomotive by means of different series-parallel connections of the driving motors and by weakening of the motor fields. The principle of the invention is equally easily applicable to a locomotive generating the current for its own traction motors such as for instance a Diesel-electric locomotive. In such a locomotive, the auxiliary unit will carry the Diesel engine coupled to a suitable generator and will also carry the control equipment suitable for the regulation of the Diesel engine and of the generator.

From a description of the above embodiments it will be understood that the greater portion of the auxiliary and control equipment of the locomotive is removed from the driving unit thereby permitting increase of the size of the traction motors to any desired extent provided such motors do not reach a size exceeding the limits of the loading gauge. Such motors may then utilize the adhesion of the driving axles to the full extent thereof up to any desired running speed, the current in the motors below such speed then being regulated in a manner similar to the manner in which the starting current is regulated.

The advance represented by a locomotive such as described in the present specification over the type of locomotive known heretofore will be apparent from a consideration of the diagram shown in Fig. 8. In the diagram, curve 49 represents the tractive effort of a driving unit such as unit 50 illustrated in Fig. 2. Curve 48 represents the tractive effort of an electric locomotive of the type known heretofore having the same number of driving axles and the same maximum running speed as driving unit 50. As stated above, the tractive effort at starting is limited to a predetermined value for each axle by the adhesion limit of the wheels so that the tractive effort at starting will be the same for either locomotive and will be maintained at the maximum value at which the wheels will not slip by control of the current in the traction motors. In an alternating current locomotive or in a Diesel-electric locomotive such current can be conveniently regulated without excessively decreasing the efficiency of the locomotive as is well known in the art. Due to the increase of the output capacity of the motors provided in driving unit 50, such motors are capable of developing a larger tractive effort than the motors of the locomotives used at present so that such tractive effort must be limited to the adhesion limit over a greater range of speeds and, at the highest running speeds of the locomotive, may be utilized to its full extent. Curves 52 and 53 represent the power output of the motors of the locomotives, now known and herein disclosed respectively, over the range of running speeds.

It has been found that, in order to obtain the high speed tractive effort of unit 50, three locomotives having the same number of driving axles but of the type known heretofore would have to be connected to the train. The starting tractive effort given by three locomotives as now constructed would be greater than that of unit 50 but such tractive effort could not be utilized to any greater extent than the tractive effort of unit 50. The above may be seen from a consideration of Fig. 8 in which line 51 represents the tractive effort to be exerted by the locomotive to pull a train of predetermined weight. From the diagram it may be seen that, in order to pull such a train at a speed represented by point A, the tractive effort of the locomotive must be not less than that represented by curve 49. The use of three locomotives as now known would present the additional disadvantage of involving the use of three times as many pieces of equipment which would weigh considerably more than the equipment of driving unit 50 and of auxiliary unit 55. In particular, the weights of the transformers and the main frames of the three locomotives would be approximately 50 per cent greater than the weight of transformer 37 and frame 57.

It may seem that the weight of the auxiliary equipment is subtracted from the weight required for loading the driving axles. It has been found, however, that, in driving units such as 11 or 50, the weight of the motors and of the frame is sufficient to load the driving axles to their present limit so that the auxiliary equipment would have to be carried by idling wheels whether such equipment is included in the driving unit or in a separate auxiliary unit. If it is desired to increase the tractive effort at starting to a value greater than the tractive effort normally permitted by the adhesion of the driving axles, the tension of the springs of the idlers of the driving unit may be relieved at starting so as to momentarily apply an excess of load on the driving axles. The idlers 26 of the driving unit or the wheels of trucks 43 may also be provided with small motors to be energized only at starting so as to increase the starting tractive effort in the same manner as by the use of boosters in steam locomotives.

When more than one driving unit is connected with one auxiliary unit as in the embodiment illustrated in Fig. 1, the weight and the cost of the entire locomotive per horsepower is further decreased as the size and weight of the auxiliary equipment increase less rapidly than the rating of such equipment.

By the use of locomotives built in accordance with the present invention, the number of spare units required for a number of operating units will be substantially halved; if either the driving unit or the auxiliary unit becomes defective, only the defective unit needs to be taken into the repair shops and another unit may be substituted therefor and coupled to the remaining sound unit. It is, in general, possible to design locomotives of different types to be used for different classes of service such as freight service and passenger service, in which the driving motors operate at the same voltage so that the same auxiliary unit may be used in conjunction with different classes of driving units, thereby permitting further reduction in the number of spare auxiliary units by employing auxiliary units of a rating commensurate with the rating of the largest driving units used. The same driving unit may also be used over sections of track which are electrified or over non-electrified sections by coupling such driving unit either with an auxiliary unit designed to receive current from the trolley wire or with a Diesel electric auxiliary unit.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an articulated locomotive, a power unit having drive wheels, electric motors mounted in said power unit, said motors being arranged alternately singly and in pairs on each side of said power unit, a single one of said motors and a pair of said motors being connected with each pair of the drive wheels of said power unit, a control unit, and means mounted only in said control unit to regulate the flow of electric current to said motors, said units being interchangeable.

2. In an electric locomotive, a plurality of motors arranged over the drive wheels of the locomotive, said motors being arranged alternately singly and in pairs on each side of the locomotive, a single one of said motors and a pair of said motors being connected with each pair of the drive wheels.

3. In an electric locomotive, a plurality of motors arranged over the drive wheels of the locomotive, said motors being arranged alternately singly and in pairs on each side of the locomotive, a single one of said motors and a pair of said motors arranged oppositely each other being connected with each pair of the drive wheels.

4. In an electric locomotive, a plurality of motors arranged over the drive wheels of the locomotive, said motors being arranged alternately singly and in pairs on each side of the locomotive, a single one of said motors and a pair of said motors being connected individually with each pair of the drive wheels.

WALTER A. GIGER.